(12) United States Patent
Pandurangan et al.

(10) Patent No.: US 8,418,118 B2
(45) Date of Patent: Apr. 9, 2013

(54) ARCHITECTURE GUIDED OPTIMAL SYSTEM PRECISION DEFINITION ALGORITHM FOR CUSTOM INTEGRATED CIRCUIT

(76) Inventors: Anand Pandurangan, Sunnyvale, CA (US); Pius Ng, Hillsboro, OR (US); Siva Selvaraj, Sunnyvale, CA (US); Satish Padmanabhan, Sunnyvale, CA (US)

( * ) Notice: Subject to any disclaimer, the term of this patent is extended or adjusted under 35 U.S.C. 154(b) by 221 days.

(21) Appl. No.: 12/906,804

(22) Filed: Oct. 18, 2010

(65) Prior Publication Data
US 2012/0095583 A1    Apr. 19, 2012

(51) Int. Cl.
G06F 9/455    (2006.01)
G06F 17/50    (2006.01)

(52) U.S. Cl. ......... 716/132; 716/110; 716/133; 716/135
(58) Field of Classification Search ............... 716/132
See application file for complete search history.

(56) References Cited

PUBLICATIONS

Gaffar, Altaf Abdul; Mencer, Oskar; Luk, Wayne; Cheung, Peter Y.K.; "Unifying Bit-width Optimisation for Fixed-point and Floating-point Designs," Apr. 2004, IEEE.*
Fang, Fang; Chen, Tsuhan; Rutenbar, Rob A.; "Floating-Point Bit-Width Optimization for Low-Power Signal Processing Applications," 2002, IEEE.*

* cited by examiner

*Primary Examiner* — Vuthe Siek
*Assistant Examiner* — Eric Lee
(74) *Attorney, Agent, or Firm* — Tran & Associates (57) ABSTRACT

Systems and methods are disclosed to automatically determine an optimal number format representation for a model or code to be implemented in a custom integrated circuit (IC) by determining a ratio of dynamic range to static range in the model or code, and selecting a floating point or a fixed point number representation based on the ratio; determining the optimal number representation format based on a cost function that includes hardware area and power cost associated with a predetermined bit precision arithmetic; automatically generating a processor architecture customized to the optimal number representation format; and synthesizing the generated processor architecture into a computer readable description of the custom integrated circuit for semiconductor fabrication.

16 Claims, 7 Drawing Sheets

ARCHITECTURE GUIDED OPTIMAL SYSTEM PRECISION DEFINITION ALGORITHM FOR CUSTOM INTEGRATED CIRCUIT

The present invention relates to a method for automatically selecting fixed or floating point representation in a custom integrated circuit (IC) or an application-specific integrated circuit (ASIC).

BACKGROUND

As electronics become more user friendly, the features imposed on the electronics have grown. For example, in a typical hardware product development cycle for an embedded application, algorithm development is done first by algorithm experts. During implementation, engineers translate the design into hardware using an ASIC solution or a using a programmable solution such as a digital signal processor (DSP) core. If this is possible, the designers develop assembly code to target the DSP core using the tools provided by the DSP vendor. As the performance/memory footprint is very important, engineers who understand algorithms and also the micro-architecture and tools of the target DSP need to be employed to develop the firmware.

Porting a floating point algorithm to fixed point number system is a common problem faced in the development of products—especially those that involve the implementation of signal processing algorithms. Unfortunately this effort is often dictated not by the technical merits of a number format representation, but by the availability of processors or perceived cost of implementation. It is important that the number format used during the signal processing stage be chosen well so as to realize the gain expected from the system. Much work has been done in converting a floating point system model to fixed point system implementation on an off the shelf DSP. This is usually the case as the system designer does not have the flexibility of choosing the ALU width in the DSP. The system designer has to accept what is given (or available) and port the system from a floating point model to the number representation supported by the DSP.

The benefits and trade-offs associated with fixed and floating point representation are the subject of many debates. The differences in fixed point number system and floating point number system over a given signal range is given in the examples shown in FIGS. 1A-1B and discussed next.

Figure 1A:
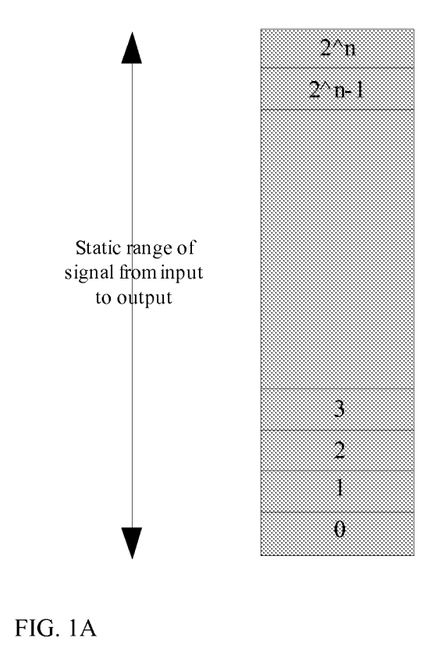
FIG. 1A-1B show exemplary number representations.

Turning now to FIG. 1A, if the number format representation is limited to N bits, the system can perform $2^N$ possible representations. If the range of signal power (and hence amplitude) at the input is spread over x dB, and for the sake of simplicity, if there is a uniform gain through the system so that the output signal spread (and signal spread at any point in the system) is over the same x dB. Then the $2^N$ representations can be uniformly distributed over this range of x dB. The hardware cost of the system reduces as N is decreased. However, this leads to fewer bins and more quantization errors. One classical method of countering this problem in typical communication systems uses scaling. While the static range of the input signal could be quite large, the dynamic range of the signal over the time constant of the system is only a fraction of that. So, by employing suitable scaling, it is possible to limit the range represented by our number system to a small fraction of x dB. This operation is conventionally done by the system designer with due consideration since scaling introduces the potential of rounding noise in addition to the quantization noise.

Figure 1B:
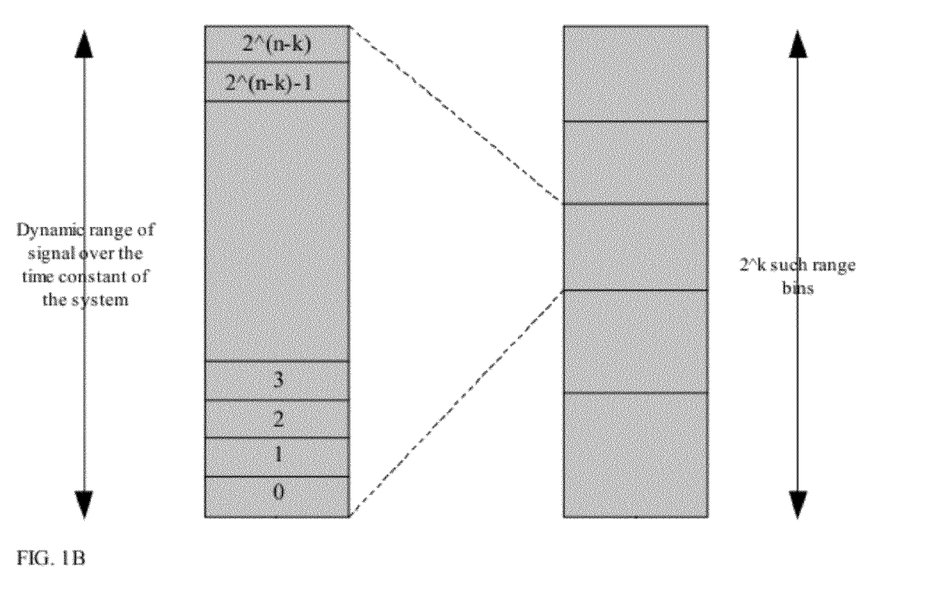

FIG. 1B shows an exemplary case where the same N bits are used in a floating point scheme. If k bits are used for exponent and n–k bits are used for mantissa, the representation becomes quite complex to render in a single figure (as done for fixed point). However, if the representation is chosen well, it is possible to have a format where $2^{(n-k)}$ bits of mantissa cover any given dynamic range of the signal and $2^k$ such range bins exist in the signal spread. For example, if the signal spread is 80 dB and this range can be safely divided into eight 10 dB bins, then 3 bits are needed for the exponent and the remaining n-3 bits can be used for the mantissa. This is represented in FIG. 1B.

During development, a designer crafts a system model or algorithm to solve a particular problem. Usually, the first system model is expressed in floating point to avoid quantization and rounding noise issues. After the system model has been developed, the system designer then converts the model, code or algorithm into an implementation for a particular architecture whose fixed/floating point characteristics are pre-specified. When the system designer considers fixed point implementations, the scaling points and scaling algorithms have to be manually defined. This is often done without a precise idea of the hardware of computational cost of such methods. When a floating point representation different from the model is chosen form implementation, the system designer has no control over the bits used for exponent or mantissa and hence has to deal with a sub-optimal representation format.

SUMMARY

In one aspect, systems and methods are disclosed to automatically generate a custom integrated circuit (IC) described by a computer readable code or model, the IC having at least a floating point parameter, a performance constraint, and a static range and a dynamic range for an input signal. This is done by determining a ratio of dynamic range to static range and if the ratio exceeds a predetermined value, selecting a floating point number representation and otherwise selecting a fixed point number representation; selecting a number representation format based on the performance constraint; automatically generating a processor architecture including hardware uniquely customized to the selected number representation format; and synthesizing the generated processor architecture into a computer readable description of the custom integrated circuit for semiconductor fabrication.

Implementations of the above aspects may include one or more of the following. The method includes executing computer readable code on a custom IC with the generated processor architecture. The number representation format can be further selected based on one or more IC performance requirements, comprising determining memory storage requirement of the number representation, hardware area and power cost, real-time performance, or performance degradation in either number representation. The number of bits needed in the number representation format is determined, and the number of bits can have an odd number of bits rather than commonly used number of bits such as 8, 16, 24, 32, 64, 128, or $2^N$ bits. The process also includes checking that the selected number representation format is below a noise floor.

Advantages of the preferred embodiments may include one or more of the following. The system automates the evaluation process so that all costs are taken into consideration and system designer gets the best possible number representation and bit width candidates to evaluate. The method can evaluate the area, timing and power cost of a given HW implementation in a quick and automated fashion. This methodology is used as a cost computing engine. The process uses a design-verify-optimize method to find the best number format representation for a given application. The method enables the synthesis of the DSP automatically based on the algorithm in an optimal fashion. This gives the system a new degree of flexibility—the number format and the ALU width can be non-standard. It can be chosen to suit the system requirements. However, the system designer does not need to be aware of the hardware area, delay and power cost associated with the choice of a particular representation over another one. The method can arrive at the optimal number format representation for a given system or at least narrow down the set of choices for the system designer in order to enable the design of an optimal system. The process allows hardware area, delay and power to be modeled as accurately as possible at the algorithm evaluation stage. Fixed point and floating point representations are considered from a holistic point of view. The number precision alteration process is automated. The system can evaluate the performance of the system and measure the increase in noise floor. The system considers the real time performance constraint from a holistic point of view, not just the execution unit alone and hence the area, power and performance characteristics of the complete custom IC are enhanced significantly.

Other advantages of the preferred embodiments of the system may include one or more of the following. The system alleviates the problems of chip design and makes it a simple process. The embodiments shift the focus of product development process back from the hardware implementation process back to product specification and computer readable code or algorithm design. Instead of being tied down to specific hardware choices, the computer readable code or algorithm can be implemented on a processor that is optimized specifically for that application. The preferred embodiment generates an optimized processor automatically along with all the associated software tools and firmware applications. This process can be done in a matter of days instead of years as is conventional. The described automatic system removes the risk and makes chip design an automatic process so that the algorithm designers themselves can directly make the hardware chip without any chip design knowledge since the primary input to the system is the computer readable code, model or algorithm specification rather than low level primitives.

DESCRIPTION

Figure 2A:
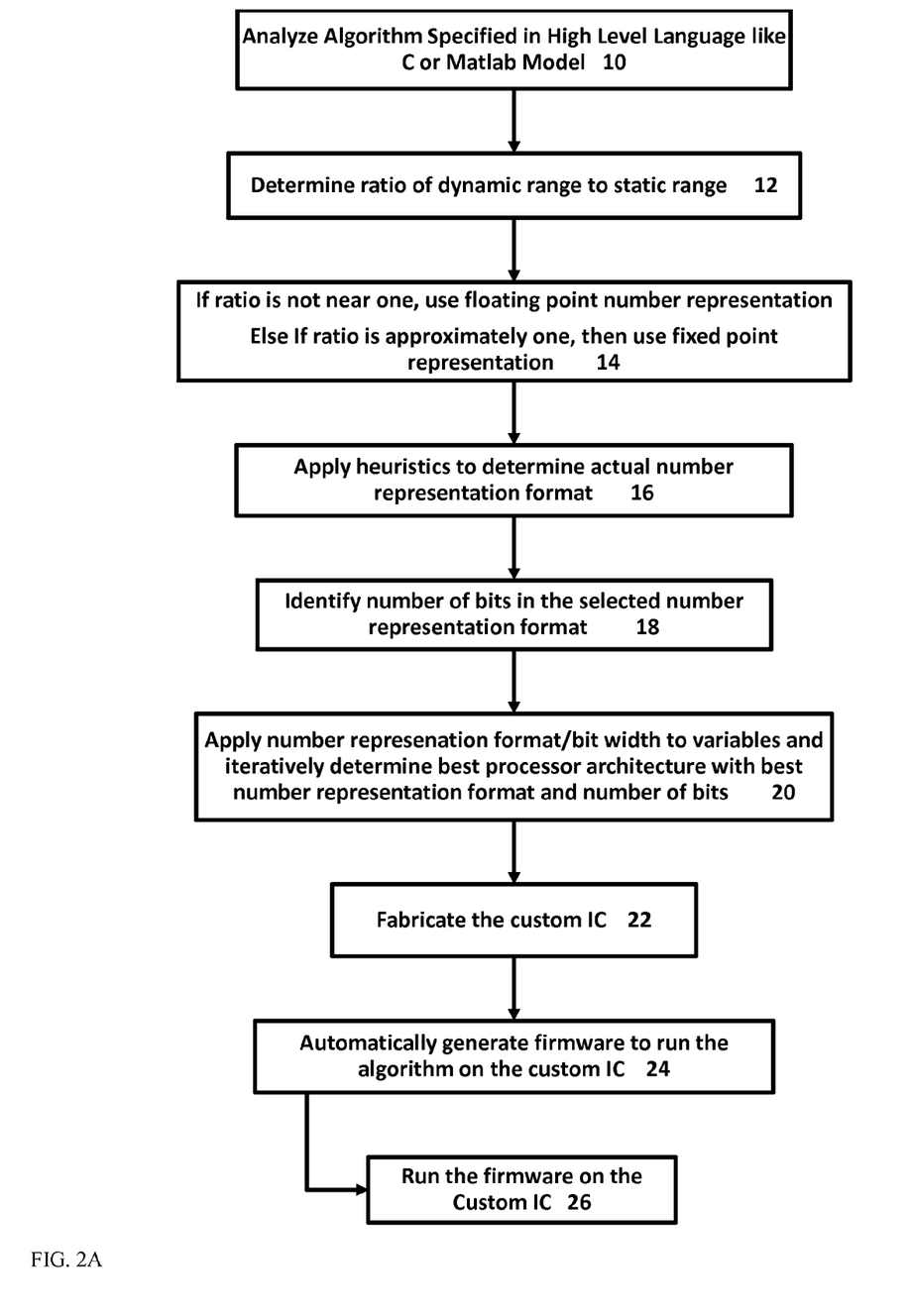
FIG. 2A shows an exemplary system operation to automatically generate a custom IC with automatic number representation format selection.

FIG. 2A shows an exemplary system operation to automatically generate a custom IC with automatic number representation format selection. The system automatically designs and generates a custom integrated circuit based on algorithmic process or code as input and using highly automated tools that requires virtually no human involvement.

Turning now to FIG. 2A, the process receives and analyzes an algorithm specified in a high level language such as C or a Matlab model (10). In one embodiment, it is assumed that the first version of the product is developed using floating point number representation. This could be any type of floating point representation but exemplary embodiments can use the 32-bit IEEE floating point representation. The process needs one or more the following to be identified by the developer or system architect of the product:

Parameters that are represented in floating point format that need to be optimized.

Working C code or model of the system.

Real-time performance constraints of the system.

Static range of input signals.

Dynamic range of the same signals through the time-constant of the system.

Maximum increase in noise floor acceptable due to rounding and quantization.

The process determines a ratio of dynamic range to static range 12. If the ratio is not near one, floating point number representation is preferred. If the ratio is approximately one, then fixed point representation is preferred (14). Next the process applies heuristics to determine actual number representation format (16). The number of bits of precision in the selected number representation format is determined (18). The process applies the selected number representation format (fixed or floating point format) and the selected bit width to variables and iteratively determines the best processor architecture with a custom arithmetic logic unit (ALU) to process the selected number representation format and number of bits (20). The custom IC with the hardware of the processor architecture is fabricated (22). The process also automatically generates firmware optimized to the processor architecture to run the algorithm on the custom IC (24). The firmware is then executed on the Custom IC to complete the transformation from algorithm to custom hardware with minimal or no human involvement, in contrast to the hand crafted custom chip design process.

The result is a custom chip solution with a new degree of flexibility—the number format and the ALU width can be non-standard. The number format and the ALU can be chosen to suit the system requirements. However, the system designer is not aware of the hardware area, delay and power cost associated with the choice of a particular representation over another one.

The system of FIG. 2A alleviates the problems of chip design and makes it a simple process. The system removes the risk and makes chip design an automatic process so that the algorithm designers themselves can directly make the hardware chip without any chip design knowledge. The primary input to the system would be the computer readable code or algorithm specification in higher-level languages like C or Matlab. The system can optimally select the best hardware instruction set with the best number point representation that optimizes execution performance with minimal noise arising from the number point selection and the bit precision. The selection of the best number representation format and bit precision is done through detailed simulation to show the best architecture given a set of performance constraints on the IC and provide significant performance benefits. In contrast, traditional approach forces the designer to use arbitrary fixed point architecture. Once the number representation format and bit precision are selected for the application code/algorithm, a custom integrated circuit is automatically generated by the system with no human involvement, thus reducing product development time and cost. Using an automatically generated software development kit (SDK) and auto generated firmware, the custom IC can run the code/algorithm efficiently.

The embodiments shift the focus of product development process from the hardware implementation process back to product specification and computer readable code or algorithm design. Instead of being tied down to specific hardware choices, the computer readable code or algorithm can be implemented on a processor that is optimized specifically for that application. The preferred embodiment generates an optimized processor automatically along with all the associated software tools and firmware applications. This process can be done in a matter of days instead of years as is conventional.

Using the process of FIG. 2A is applied to the development of a software programmable DSP, a single number format that works best across all stages in the system can be determined. If the model or code is targeted to fixed hardware, a number format that works best for various stages in the system is independently arrived at.

Figure 3:
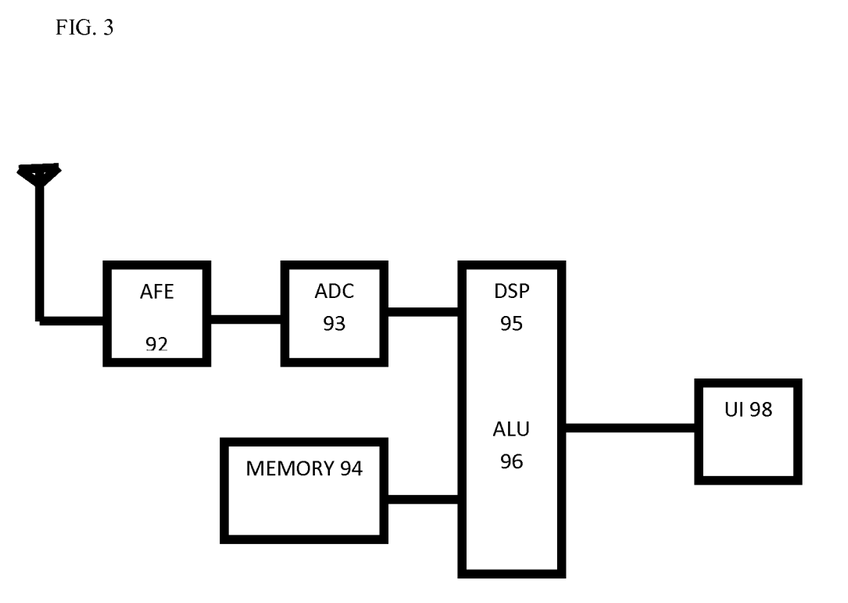
FIG. 3 shows an exemplary application of the process of FIG. 2A to a radio receiver.

Next, an exemplary application of FIG. 2A to generate custom hardware is discussed. FIG. 3 shows a communication system receiver receiving wireless signals from an antenna (not shown) and provided to an analog front end (AFE) 92. The wireless signal is captured by an analog to digital converter (ADC) 93 and provided to a digital signal processor (DSP) 95 that executes code from memory 94. The DSP 95 performs math operations using a custom designed ALU 96 in accordance with the process of FIG. 2A. The DSP 95 also receives commands from a user interface (UI) 98.

In the above system the ADC 93 is always chosen so that even the weakest signal received from the AFE 92 would have a few bits of information in the sample. The ADC 93 sample size is dictated by the input SNR under which the system is expected to operate and expected gain in the signal processing done on the samples. In the above use case, all the signal processing is done by the DSP 95. It is imperative that the number format used during the signal processing stage be chosen well so as to realize the gain expected from the system. Conventionally, the system designer does not have the flexibility of choosing the ALU width in the DSP. The system designer has to accept what is given (or available) and port the system from a floating point model to the number representation supported by the DSP 95. However, using the process of FIG. 2A, the system can automatically select the best number representation and bit width in the ALU 96 to solve a particular problem for the system designer.

The process calculates the ratio of dynamic range to static range. If this is large, the appropriate representation is likely to be floating point. In this example, the information received from the antenna is unlikely to vary over the entire static range of the signal in the span of a few samples. In such cases, a fixed point representation would need significant scaling algorithms to be implemented to ensure information is not lost. However, with a suitably chosen floating point number format (and the bit widths are chosen based on the sample size of the ADC), the scaling would be eliminated or complexity of scaling would be significantly reduced. Moreover, the number of bits needed through the various stages could be much less since in most communication receiver applications, only a few significant bits are needed for processing. The extra bits needed with a fixed point representation to prevent overflow is limited due to a floating point representation.

In case, the static range of the signal and dynamic range of the signal is the same (typically in image processing), it is likely that a fixed point representation would work better. Fixed point hardware is smaller in area and consumes lesser power for the same number of bits. Given that the dynamic range of the signal is large, it is unlikely that the floating point representation would be able to reduce the number of bits needed without compromising the processing precision.

Figure 2B:
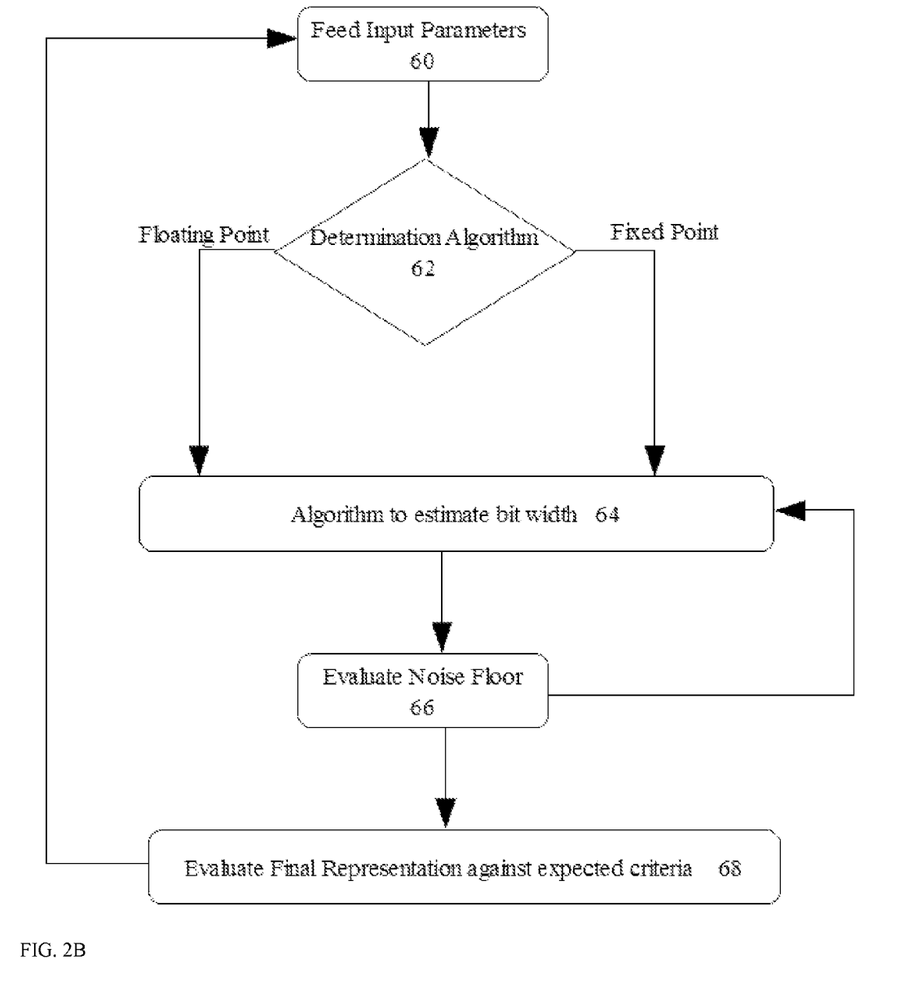
FIG. 2B shows in more detail an automatic number representation determination process.

FIG. 2B shows in more detail the automatic number representation determination process. In FIG. 2B, input parameters are received (60). The determination process is then performed (62). After the automatic selection of floating point or fixed point format, to process determines the desired bit width (64). A noise floor is evaluated (66), and if the noise constraints are not met, the process loops back to 64 to increase the bit width as needed. From 66, the process evaluates the final number representation against constraints or criteria that the system has to meet (68).

An optimization cost function is used to arrive at the decision regarding the preferred number format for the given system. The cost function comprises of the following.

Estimated savings in memory storage due to usage of floating point representation.

Evaluation of the hardware area and power cost for the two potential implementation candidates.

Evaluation of real-time performance condition in either case.

Estimated deterioration in performance due to either format.

With these parameters as inputs to the cost function, the optimization algorithm proceeds to arrive at the decision as to whether a floating point representation is necessary for this system. If not, the algorithm recommends the fixed point representation.

Once a decision is made with respect to the format chosen, the next step is to identify the precise number of bits needed in that format.

Figure 2C:
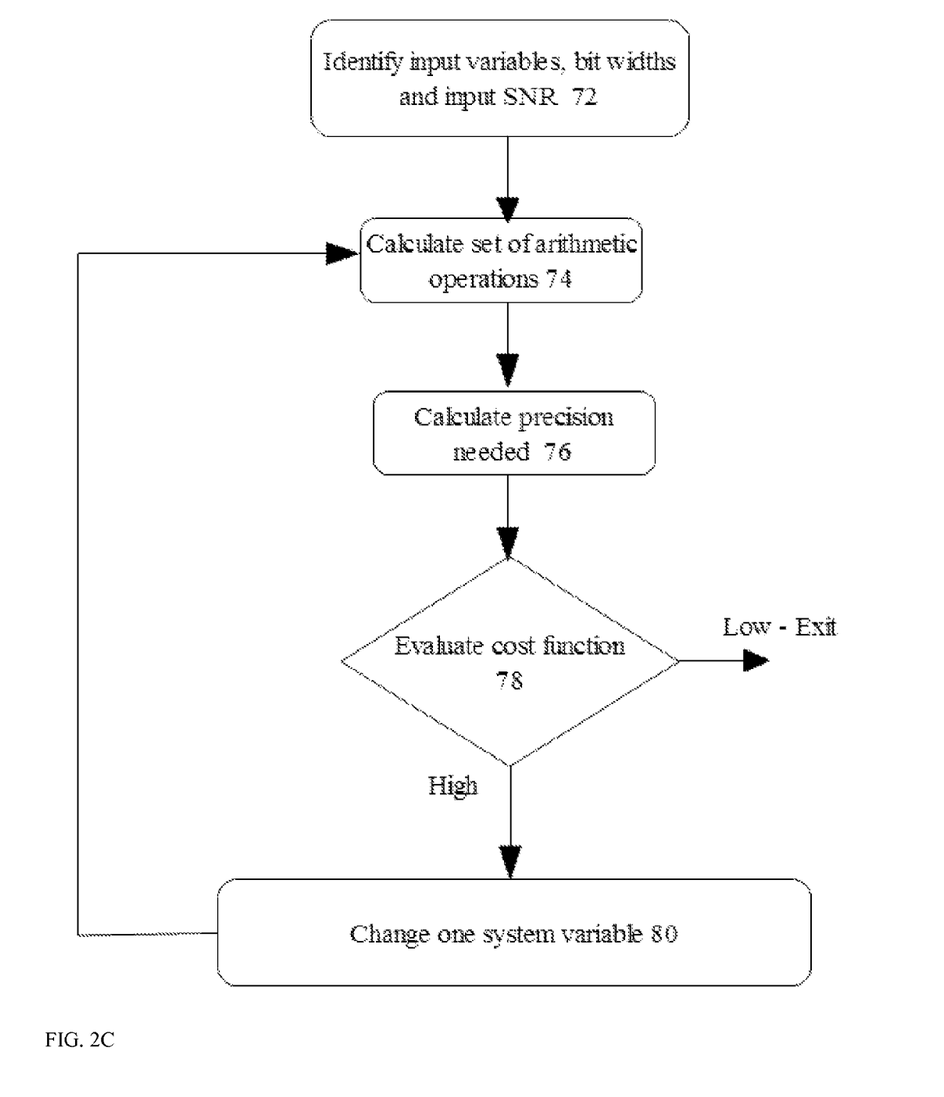
FIG. 2C shows in more detail an automatic precision determination process.

FIG. 2C shows in more detail an automatic precision determination process. First, the process identifies input variables, bit widths, and desired signal-to-noise ratio (SNR) (72). Next, the process determines the arithmetic operations to be done (74). The process determines the required precision (76). Next, the process evaluates a cost function associated with the required precision (78). If the cost function is below a predetermined threshold, the process exits. Alternatively, if the cost is high, the process changes one system variable and loops back to continue the precision determination process (74).

In one embodiment, the precision estimation algorithm includes code to:

1) Identify all system critical inputs and their bit widths. This is one of the inputs to the algorithm;

2) Identify the input SNR. This must also be an input to the system;

3) Identify the set of all arithmetic operations on these variables using static parsing of the system model description;

4) Estimate the precision needed to accommodate the set of arithmetic operations with minimal decrease in SNR;

5) Evaluate the cost function; and

6) If cost is higher than threshold, march along one of the various axis that decreases the cost. The result of the cost function would indicate the axis to march along. In one example, this may include inserting scaling stages to reduce number of significant bits, merging of arithmetic operations to maintain wider internal precision while maintaining smaller input and output precision, accepting a decrease in SNR, increasing the frequency of the system to perform more smaller precision operations in parallel to achieve higher precision result, decreasing the precision of some stages in the system and increasing in others but reducing the total cost, among others.

Unlike standard DSPs which limit themselves to 16, 24 or 32 bit representation, the system evaluates all representation formats. The decision taken at the previous step involves a rough estimate of the number of bits needed. This is further fine-tuned in this operation. In order to perform this operation, again a cost function such as the following can be used. In one implementation, the cost function includes methods for:

Evaluation of hardware area and power cost associated with the implementation of a given bit precision arithmetic;

Evaluation of the real-time performance constraints for the given bit-precision arithmetic. This is possible to calculate since the algorithm can estimate the hardware delay involved in implementing the given bit precision arithmetic;

Estimation of the deterioration in the SNR of the system due to this number format; and The number of arithmetic operations performed on the critical system variables and arrays that determine the performance of the system.

The defined cost function is used by the optimization algorithm to evaluate the possible number format representation candidates and arrive at the optimal representation. The algorithm starts with the precision defined in the system model and uses the information regarding the number of arithmetic operations performed on any given variable to arrive at a candidate for the number format for that variable. Then the cost is evaluated and if the cost is acceptable, the format chosen is preserved. Otherwise, a new format is arrived at by marching along the best possible axis (inferred from the estimated cost) and the process is repeated. This algorithm is explained in detail in a section below.

The optimized bit precision approximation is used to represent the variables in the code automatically and the performance of the system through various use-case scenarios is estimated.

The results are compared against the requirements to optimize the representation further. In case the final representation chosen varies drastically from the estimated bit precision, that operation is revisited based on additional information available and the optimization process is run again.

All the steps mentioned above are automated and do not require active human intervention. However, the inputs and constraints at the start and at the end of stage need to be provided by a trained user well versed with the functioning of the algorithm.

Figure 4:
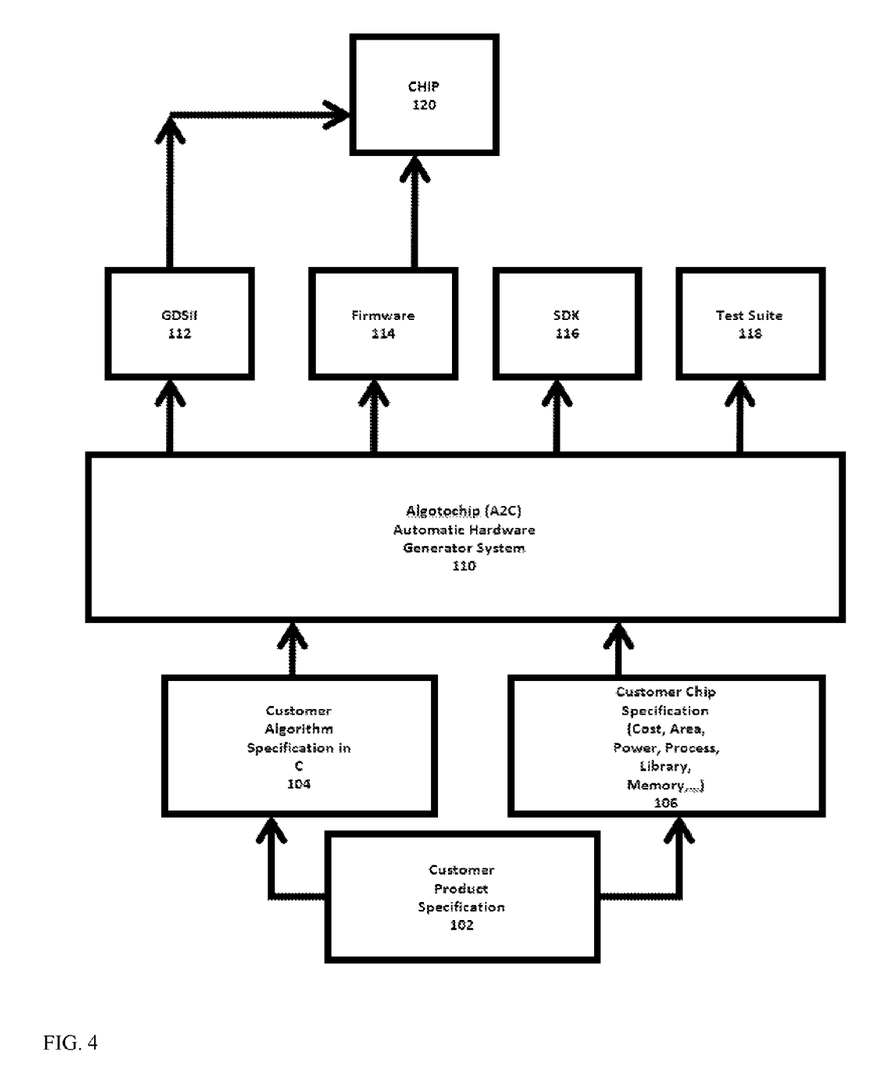
FIG. 4 shows an exemplary system to automatically generate a custom IC.

FIG. 4 shows an exemplary system to automatically generate a custom IC. The system of FIG. 4 supports an automatic generation of an architecture with optimal instruction set using instruction set compression and variable width encoding for a programmable hardware solution for the chosen target application. The target application specification is usually done through algorithm expressed as computer readable code in a high-level language like C, Matlab, SystemC, Fortran, Ada, or any other language. The specification includes the description of the target application and also one or more constraints such as the desired cost, area, power, speed, performance and other attributes of the hardware solution.

In FIG. 4, an IC customer generates a product specification 102. Typically there is an initial product specification that captures all the main functionality of a desired product. From the product, algorithm experts identify the computer readable code or algorithms that are needed for the product. Some of these algorithms might be available as IP from third parties or from standard development committees. Some of them have to be developed as part of the product development. In this manner, the product specification 102 is further detailed in a computer readable code or algorithm 104 that can be expressed as a program such as C program or a math model such as a Mathlab model, among others. The product specification 102 also contains requirements 106 such as cost, area, power, process type, library, and memory type, among others.

The computer readable code or algorithm 104 and requirement 106 are provided to an automated IC generator 110. Based only on the code or algorithm 104 and the constraints placed on the chip design, the IC generator 110 automatically generates with few or no human involvement an output that includes a GDS file 112, firmware 114 to run the IC, a software development kit (SDK) 116, and/or a test suite 118. The GDS file 112 and firmware 114 are used to fabricate a custom chip 120.

The instant system alleviates the issues of chip design and makes it a simple process. The system shifts the focus of product development process back from the hardware implementation process back to product specification and algorithm design. Instead of being tied down to specific hardware choices, the algorithm can always be implemented on a processor that is optimized specifically for that application. The system generates this optimized processor automatically along with all the associated software tools and firmware applications. This whole process can be done in a matter of days instead of years that it takes now. In a nutshell the system makes the digital chip design portion of the product development in to a black box.

In one embodiment, the instant system product can take as input the following:

Computer readable code or algorithm defined in C/Matlab
Peripherals required
Area Target
Power Target
Margin Target (how much overhead to build in for future firmware updates and increases in complexity)
Process Choice
Standard Cell library Choice
Testability scan The output of the system may be a digital hard macro along with all the associated firmware. A software development kit (SDK) optimized for the digital hard macro is also automatically generated so that future upgrades to firmware are implemented without having to change the processor.

The system performs automatic generation of the complete and optimal hardware solution for any chosen target application. While the common target applications are in the embedded applications space they are not necessarily restricted to that.

By way of example, a computer to support the automated chip design system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to automatically determine an optimal number format representation for a model or code to be implemented in a custom integrated circuit (IC), comprising:
    a. determining a ratio of dynamic range to static range in the model or code, and selecting a floating point or a fixed point number representation based on the ratio;
    b. determining an optimal number representation format based on a cost function that includes hardware area cost and power cost associated with a predetermined bit precision arithmetic and taking into consideration a signal to noise ratio (SNR) and an estimated precision needed to accommodate a set of arithmetic operations with minimal decrease in the SNR, including:
        identifying arithmetic operations on variables using a static parsing of a system model description;
        estimating a precision needed to accommodate the arithmetic operations with minimal decrease in SNR;
        evaluating the cost function and if the cost is higher than a threshold, marching along a variable axis that decreases the cost;
    c. automatically and iteratively generating a processor architecture customized to the optimal number representation format; and
    d. synthesizing the generated processor architecture into a computer readable description of the custom integrated circuit for semiconductor fabrication by using a computer.

2. The method of claim 1, comprising using a memory storage requirement for the number representation as an optimization cost.

3. The method of claim 1, comprising determining real-time performance for the number representation as an optimization cost.

4. The method of claim 1, comprising determining the number of bits needed in the number representation format.

5. The method of claim 4, wherein the number of bits comprises an odd number of bits.

6. The method of claim 1, comprising determining if the selected number representation format pushes an input signal value below a noise floor.

7. The method of claim 1, comprising evaluating the optimal number representation format using a cost function and marching along a variable axis to meet a system cost requirement if the cost function evaluation exceeds a desired cost.

8. The method of claim 1, comprising inserting a scaling operation in the model or code to achieve a desired cost.

9. A system to automatically determine an optimal number format representation for a model or code to be implemented in a custom integrated circuit (IC), comprising a processor executing computer readable code to:
    a. determine a ratio of dynamic range to static range in the model or code, and selecting a floating point or a fixed point number representation based on the ratio;
    b. determine the optimal number representation format based on a cost function that includes hardware area and power cost associated with a predetermined bit precision arithmetic and taking into consideration a signal to noise ratio (SNR) and an estimated precision needed to accommodate a set of arithmetic operations with minimal decrease in the SNR, including:
        identifying arithmetic operations on variables using a static parsing of a system model description;
        estimating a precision needed to accommodate the arithmetic operations with minimal decrease in SNR;
        evaluating the cost function and if the cost is higher than a threshold, marching along a variable axis that decreases the cost;
    c. automatically and iteratively generate a processor architecture customized to the optimal number representation format; and
    d. synthesize the generated processor architecture into a computer readable description of the custom integrated circuit for semiconductor fabrication.

10. The system of claim 9, comprising code to use a memory storage requirement for the number representation as one optimization cost.

11. The system of claim 9, comprising code to determine real-time performance for the number representation as one optimization cost.

12. The system of claim 9, comprising code to determine the number of bits needed in the number representation format.

13. The system of claim 12, wherein the number of bits comprises an odd number of bits.

14. The system of claim 9, comprising code to determine if the selected number representation format pushes the required signal below a noise floor.

15. The system of claim 9, comprising code to evaluate the optimal number representation format using a cost function and marching along a variable axis to meet a system cost requirement if the cost function evaluation exceeds a desired cost.

16. The system of claim 9, comprising code to insert a scaling operation in the model or code to achieve a desired cost.

* * * * *